(12) United States Patent
Rytlewski et al.

(10) Patent No.: US 6,641,372 B2
(45) Date of Patent: Nov. 4, 2003

(54) DUAL DISCHARGE HYDRAULIC PUMP AND SYSTEM THEREFOR

(75) Inventors: Thomas C. Rytlewski, Auburn, MI (US); David R. Aden, Saginaw, MI (US); James L. Davison, Freelan, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/228,226

(22) Filed: Aug. 26, 2002

(65) Prior Publication Data

US 2002/0192080 A1 Dec. 19, 2002

Related U.S. Application Data

(63) Continuation-in-part of application No. 09/489,366, filed on Jan. 21, 2000, now abandoned.

(51) Int. Cl.[7] .......................... F04B 49/00; F04B 17/00
(52) U.S. Cl. .................... 417/300; 417/279; 417/299; 417/302; 417/410.3
(58) Field of Search ................. 417/229, 300, 417/293, 299, 302, 410.3, 505

(56) References Cited

U.S. PATENT DOCUMENTS

| | | | | |
|---|---|---|---|---|
| 3,632,238 A | * | 1/1972 | Searle | 418/15 |
| 4,183,723 A | * | 1/1980 | Hansen et al. | 417/204 |
| 4,485,883 A | | 12/1984 | Duffy | 180/142 |
| 4,597,718 A | | 7/1986 | Nakano et al. | 417/300 |
| 4,599,051 A | | 7/1986 | Numazawa et al. | 417/293 |
| 4,691,797 A | | 9/1987 | Miller | 180/143 |
| 5,017,098 A | * | 5/1991 | Hansen et al. | 417/302 |
| 5,048,628 A | | 9/1991 | Rayner | 180/141 |
| 5,137,498 A | * | 8/1992 | Gunsing | 474/28 |
| 5,170,626 A | | 12/1992 | Ohtaki et al. | 60/468 |
| 5,184,693 A | * | 2/1993 | Miller | 180/423 |
| 5,547,349 A | | 8/1996 | Kimura et al. | 417/282 |
| 5,609,474 A | | 3/1997 | Ohno | 417/288 |
| 5,667,448 A | * | 9/1997 | Friedmann | 474/18 |

FOREIGN PATENT DOCUMENTS

| | | | | |
|---|---|---|---|---|
| EP | 0 522 505 A2 | 1/1993 | | F04C/15/04 |
| JP | 61125966 | 6/1986 | | |
| JP | 05231342 | 9/1993 | | |

\* cited by examiner

*Primary Examiner*—Charles G. Freay
*Assistant Examiner*—Timothy P. Solak
(74) *Attorney, Agent, or Firm*—Michael D. Smith (57) ABSTRACT

A hydraulic pump includes a housing, a primary discharge outlet, an auxiliary discharge outlet, and a flow control valve for controlling fluid flow from the primary and auxiliary discharge outlets. A first fluid passageway within the housing passes fluid from a first discharge port to the primary discharge outlet, and a second fluid passageway within the housing passes fluid from a second discharge port to a common port of the flow control valve. In a first position, the valve directs fluid from the second discharge port to the primary discharge outlet. In a second position, the valve diverts fluid from the second discharge port to the auxiliary discharge outlet. The valve may be positioned in response to such operating conditions as excessive pressure differential between the high and low-pressure sides, excessive pump rate of rotation (RPM), or excessive rate of fluid flow, among others.

15 Claims, 6 Drawing Sheets

DUAL DISCHARGE HYDRAULIC PUMP AND SYSTEM THEREFOR

CROSS REFERENCE TO RELATED APPLICATION

This application is a continuation-in-part of U.S. patent application Ser. No. 09/489,366, filed Jan. 21, 2000, now abandoned.

BACKGROUND

Generally, a fluid powered systems use hydraulic pressure and flow to provide the required fluid power to the system. Such systems rely on a hydraulic pump to provide pressurized fluid which is then regulated and controlled by a valve system comprising one or more valves. The valve system regulates the pressure to release fluid pressure when it becomes too great which may cause damage to the pump and other systems. In addition, the valve system directs energy to various systems on demand.

A conventional vane-type pump comprises a cam (pump) ring having a substantially elliptical cam surface, a rotor which is adapted to rotate within the cam ring and a plurality of vanes adapted to move back and forth within radial slits formed in the rotor. The cam ring is stationary and the outer edges of the vanes touch the inside of the surface of the cam ring. Because of the substantially elliptical shape of the cam ring, the vanes slide in and out of their slots and maintain contact with the inside surface of the cam ring as the rotor turns therein. The volume of each pumping cavity constantly changes due to the elliptically shaped cam ring. Volume increases as the vanes move through the rising portion of the cam ring, drawing fluid through an intake port. When the vanes move into the "falling" portion of the ring contour, the volume decreases and forces the fluid out through the discharge ports. An intake portion of the hydraulic pump receives low-pressure hydraulic fluid from a pump reservoir. Discharged fluid, under high pressure, flows to a desired system location. In the case of an automotive fluid power system, for example, the desired system location may be a steering system to provide power assist steering.

In fixed-displacement pumps, at low engine speeds, the operating system can handle the volume of hydraulic fluid provided by the pump. Since the pump is usually directly driven by the crankshaft, line pressure dramatically increases at higher engine speeds because the pump draws and discharges a greater volume of fluid per unit time as it runs faster. These conditions raise operating temperatures and reduce pump durability and operating life. The system lines and seals are also strained. In addition, the torque necessary to drive the pump increases at higher system back pressures which corresponds to additional horsepower (energy) being required to effectively overcome the system back pressure and distribute the fluid throughout the system, thereby wasting fuel to generate unneeded line pressures.

A common prior art solution for fixed-displacement pumps has been to rely on the valve system to "short-circuit" the flow from the high-pressure side to the low-pressure side of the system at excessive operating pressures. Another pump conventionally used is a variable-displacement pump. A variable-displacement pump provides a reduction in flow as a function of operating conditions and therefore requires more costly shaft support solutions. Additionally, since variable-displacement pumps are typically single stroke, the pumps require a larger package size to provide the same pumping capacity. Variable-displacement pump valving also make these pumps less efficient in the full displacement operating condition.

SUMMARY

Disclosed herein is a hydraulic pump comprising a housing, a primary discharge outlet, an auxiliary discharge outlet, a flow control valve, a first fluid passageway within the housing passing fluid from a first discharge port to the primary discharge outlet, a second fluid passageway within the housing passing fluid from a second discharge port to a common port of the flow control valve, a third fluid passageway within the housing passing fluid from a first switched port of the flow control valve to the auxiliary discharge outlet, and a fourth fluid passageway within the housing connecting a second switched port of the flow control valve to the primary discharge outlet. The primary discharge outlet and the auxiliary discharge outlet are each adapted for connection with external lines of a hydraulic system.

The above-described and other features and advantages of the disclosed hydraulic system will be appreciated and understood by those skilled in the art from the following detailed description.

DETAILED DESCRIPTION

Figure 1:
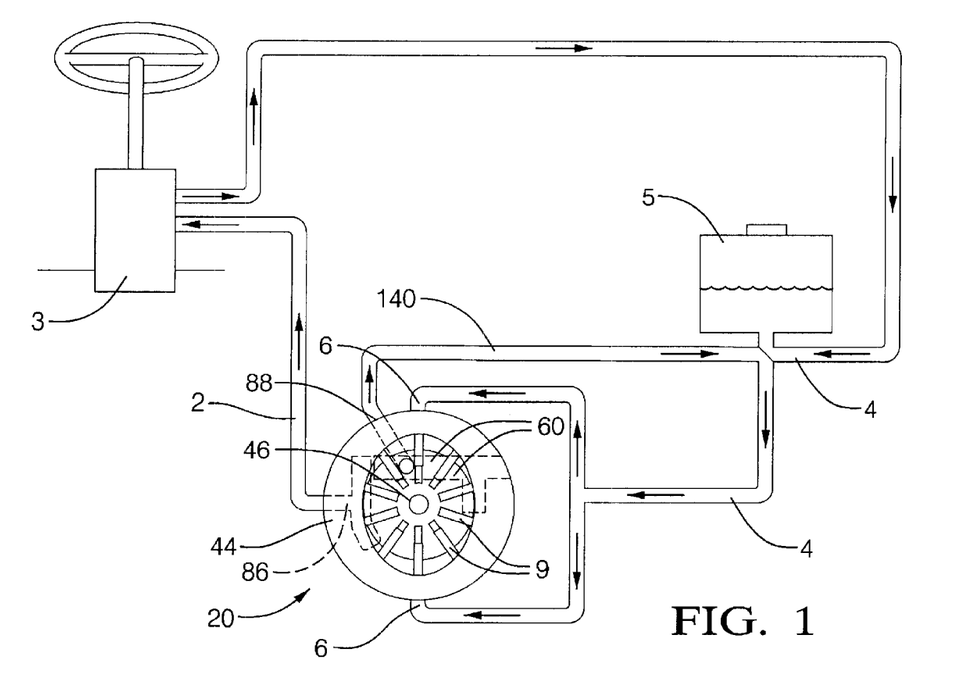
FIG. 1 is a schematic diagram of an exemplary hydraulic system for a dual discharge hydraulic pump.

FIG. 1 shows, in schematic form, a hydraulic system wherein a vane-type pump 20 having a primary discharge outlet in fluid communication with a high-pressure side 2, or external high-pressure line of the system. High-pressure line 2 feeds high pressure hydraulic fluid into primary load 3, shown here as a power steering unit. The diagram depicts a power steering system, but it is to be understood that the benefits of this system apply to any system that requires hydraulic power and, in that respect, the primary load 3 may be substituted with any system load or loads. Fluid exits primary load 3 and enters the low-pressure side 4 of the system, which is in fluid communication with a reservoir 5. The low-pressure lines 4 feed into one or more input inlets 6 of the pump 20.

Auxiliary discharge outlet 88 optionally passes a portion of the fluid deliverable by pump 20 to bypass line 140 via auxiliary discharge outlet 88. As will be further described, pump 20 is constructed such that primary and secondary discharge outlets 86, 88 are independent of one another and are not in fluid communication such that different pressures may be maintained at each outlet, depending on what is downstream from them. In the system shown in FIG. 1, since auxiliary discharge outlet 88 is connected to low pressure side 4 of the system, there is only a small amount of fluid pressure at auxiliary discharge outlet 88.

Figure 8:
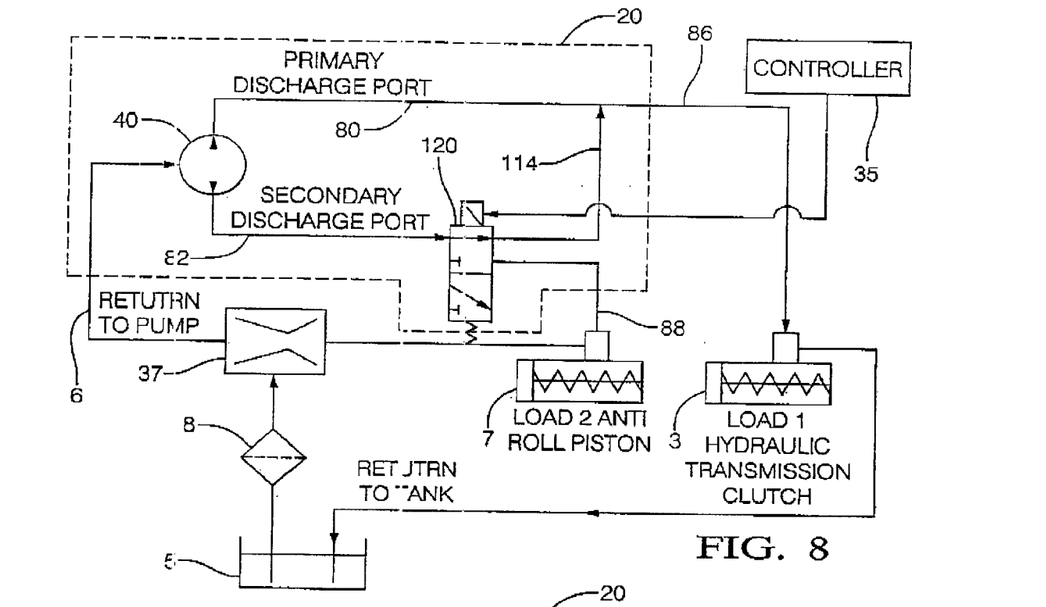
FIG. 8 shows a schematic diagram of another exemplary hydraulic system having a flow control valve in a first position.

Another exemplary hydraulic system is schematically represented in FIG. 8, which shows more detail of the internal flows of pump 20, represented here by a closed dashed line. Pump 20 includes an internal vane pump assembly 40 having first and second discharge ports 80, 82. As will be further described in detail, first discharge port 80 is in fluid communication with primary discharge outlet 86 while second discharge port 82 is in fluid communication with flow control valve 120 which directs fluid either to primary discharge outlet 86 or auxiliary discharge outlet 88. In this system, primary discharge outlet 86 is connected to primary load 3, which is a hydraulic transmission clutch, e.g., for a continuously variable transmission. Auxiliary load 7 is connected to auxiliary discharge outlet 88 via high pressure line external to pump 20. In this case, auxiliary load 7 is an anti-roll piston, and is optionally provided with pressurized fluid depending on the position of flow control valve 120.

Controller 35 actuates flow control valve 120 to the position shown in FIG. 8 in response to increased demand for more fluid at primary load 3, e.g., at low engine speeds. In the position shown, fluid from auxiliary discharge outlet 88 combines with fluid exiting primary discharge outlet 86 so that, e.g., at low engine speeds, primary load 3 is sufficiently provided with pressurized fluid under all operating conditions.

Figure 9:
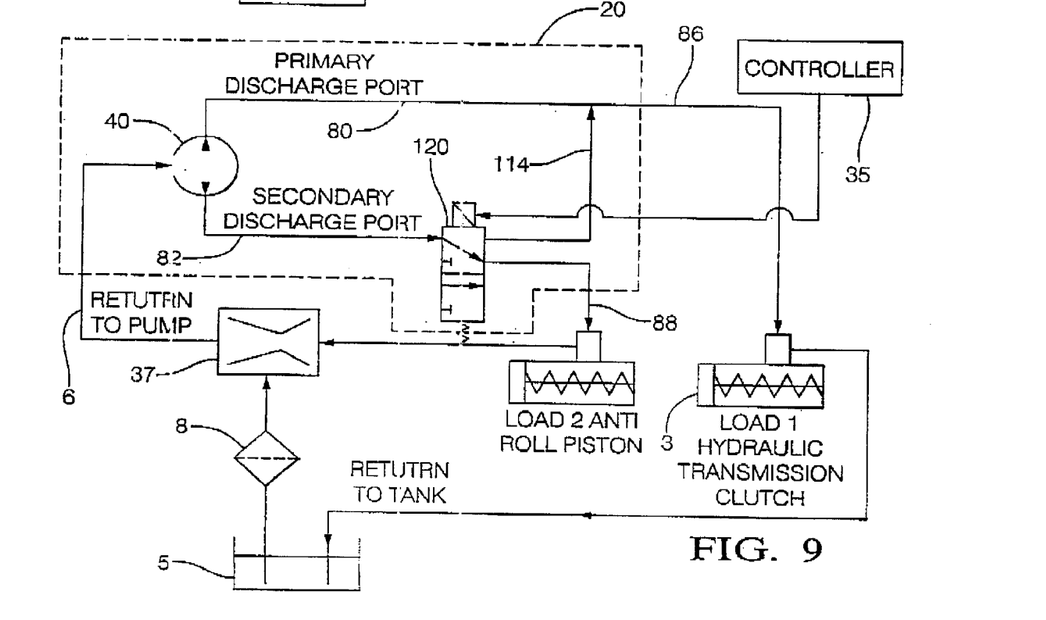
FIG. 9 shows a schematic diagram of the hydraulic system of FIG. 8 with the flow control valve in a second position.

FIG. 9 shows the system of FIG. 8 with flow control valve 120 in a second position. In this position, flow from auxiliary discharge outlet 88 is passed to auxiliary load 7, shown here as an anti-roll piston. At higher speeds, an anti-roll piston may be provided fluid as needed to prevent excess roll of the vehicle during turning maneuvers. Fluid exiting auxiliary load 7 returns to intake 6 via intake jet booster 37, which utilizes available energy of the fluid exiting auxiliary load 7 to increase fluid pressure entering pump 20 after combining with fluid from reservoir 5 and through filter 8.

Figure 10:
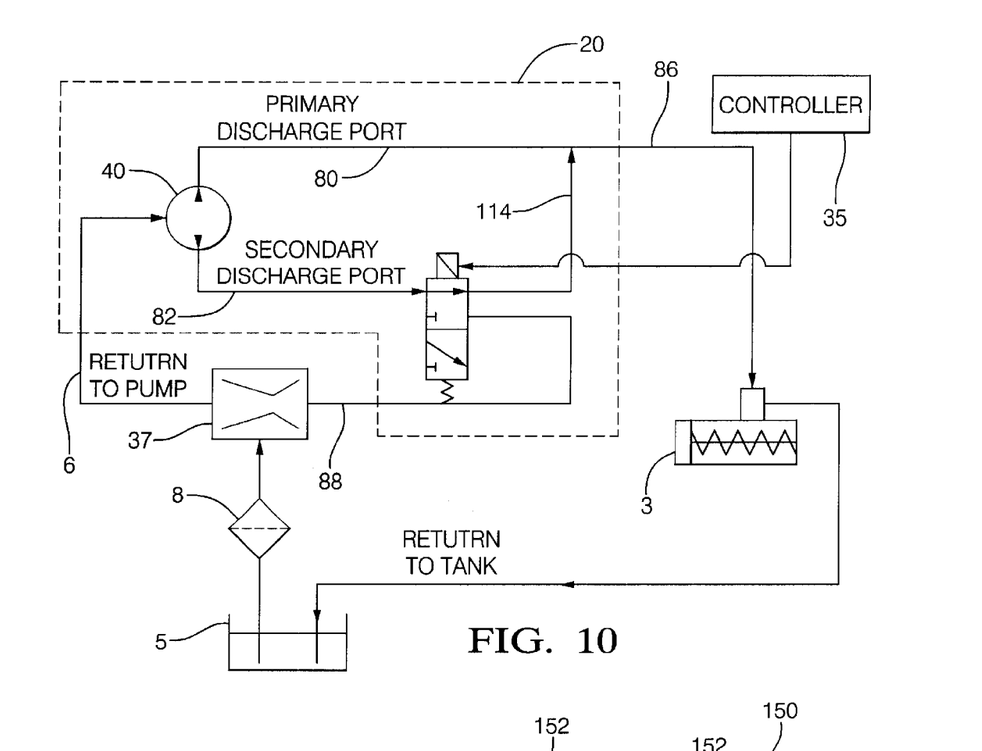
FIG. 10 shows a schematic diagram of another exemplary hydraulic system.

FIG. 10 shows a system similar to that shown in FIG. 1, but with the addition of hydraulic jet booster 37 to improve fluid pressure at the inlet to pump 20 when operating in binary mode, thus further improving efficiency over the system shown in FIG. 1.

There are many ways of implementing a dual discharge pump as described herein to improve overall efficiency. The dual discharge pump as disclosed herein accomplishes the advantages of a tandem pump but with improved packaging, cost, and overall efficiency. The following is an one way to do so using the hydraulic clutch and anti-roll pistons as primary and auxiliary loads: During vehicle launch, hydraulic clutch (primary load 3) in the continuously variable transmission requires both discharge ports to supply fluid to produce the required pressure for the pulleys in the continuously variable transmission. The anti-roll system (auxiliary load 7) does not require fluid at this time. Thus, controller 35 moves directs flow control valve 120 to the position shown in FIG. 8.

When the engine reaches a set RPM (i.e., engine speed) the controller 35 moves flow control valve 120 to the position shown in FIG. 9, thereby placing the hydraulic system into a binary mode in which both primary and auxiliary hydraulic systems are supplied. During this time the anti-roll system utilizes fluid provided by the pump to stabilize the vehicle during turning maneuvers. Pump 120 therefore supports two loads from two distinct discharge ports, each being capable of operating independently of the other. This independent capability reduces energy consumption whenever either primary or auxiliary load requirements are reduced.

When the vehicle returns to idle condition, the controller 35 switches back to the position shown in FIG. 8, thereby returning pump 120 to the normal pump mode. Both the primary and auxiliary discharge outlets 86, 88 supply fluid to the hydraulic clutch for the next vehicle launch. The anti-roll system does not require fluid at this time.

Figure 11:
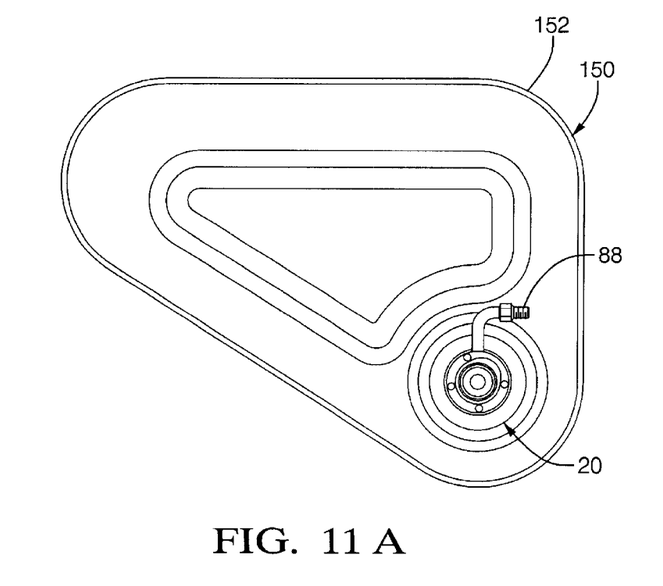
FIGS. 11A and 11B show front elevation and profile views, respectively, of a hydraulic pump mounted to a continuously variable transmission housing.

While controller 35 may be a separate entity as described above, it may also be the vehicle's main computer system, which may be controlled to control the valve and perform the steps noted above. Of course, other primary and auxiliary loads may be utilized in place of the hydraulic clutch and anti-roll piston. While it is contemplated that a single pump internal to a continuously variable transmission can supply fluid to an auxiliary device as described above, it is also contemplated that a hydraulic pump supplying fluid to both a continuously variable transmission and an auxiliary hydraulic system be external to the transmission as shown in FIGS. 11A and 11B. Here a pump 20 as described herein is attached to an external housing member 152 of continuously variable transmission 150. Auxiliary discharge outlet 88 provides fluid to the auxiliary system (not shown in FIGS. 11A, 11B). Fluid is returned from auxiliary load 7 to a reservoir or jet booster 37 internal to continuously variable transmission 150.

The construction of pump 20 will now be more fully explained with reference to FIGS. 1–7. Pump 20 operates in a manner typical of vane-type pumps. An elliptical cam ring 44 is provided within which a rotor 46 is rotatably mounted. The rotor 46 has a plurality of slots in which are slideably mounted a plurality of radial vanes 9, the spacing between each set of vanes defining a fluid chamber 60. The vanes may be spring-biased in an outwardly radial direction or may simply be forced in that direction by centrifugal force. Regardless, the vanes 9 are compelled to follow the contour of the cam 44, thereby causing the chambers 60 between the vanes to expand and contract. Charging ports are positioned to allow fluid from the low-pressure line 4 to be drawn into the expanding chambers. Discharge ports are positioned to receive fluid forced from contracting chambers for transfer to the high-pressure lines 2 via the discharge outlet 86. It is preferred that there be two charging ports and two discharge ports, each positioned 180 degrees from each other around the central axis of the rotor 46.

Figure 4:
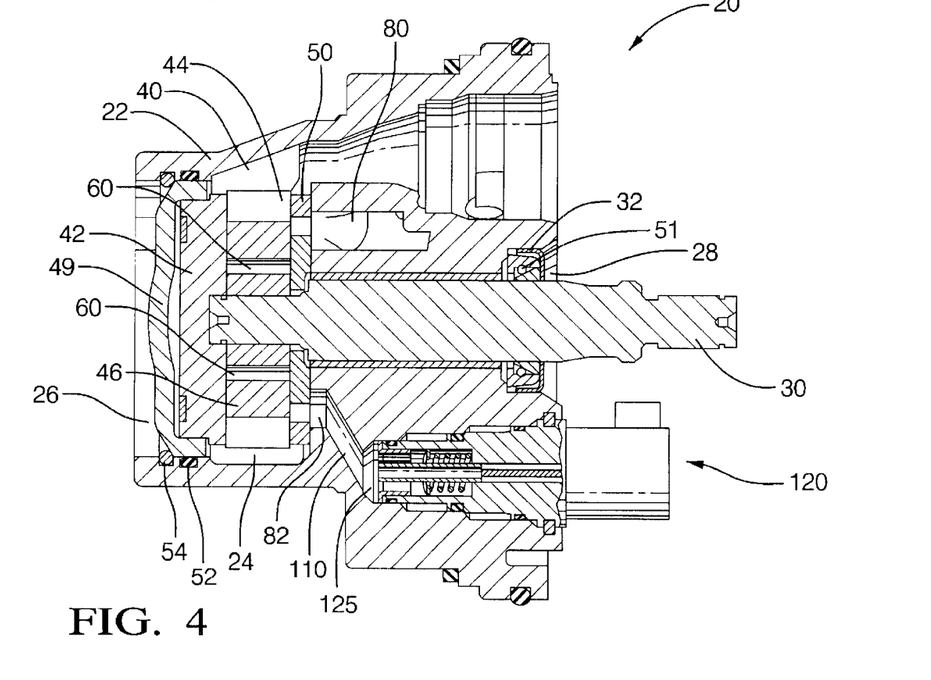
FIG. 4 is a cross sectional elevational view of an exemplary vane-type pump in accordance with the preferred embodiment.
Figure 5:
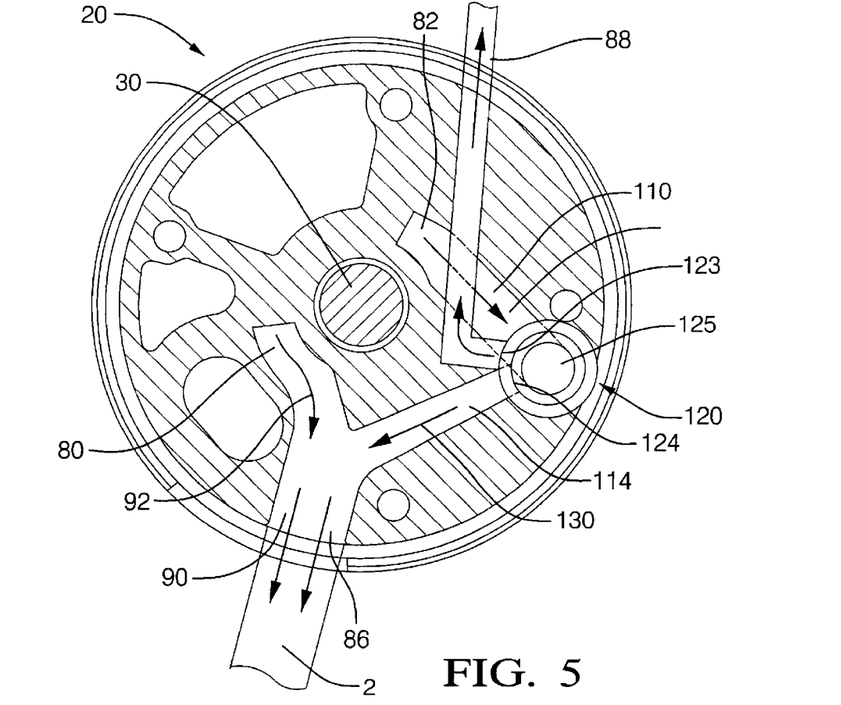
FIG. 5 is an axial cross sectional view of the exemplary vane-type pump shown in FIG. 4.
Figure 6:
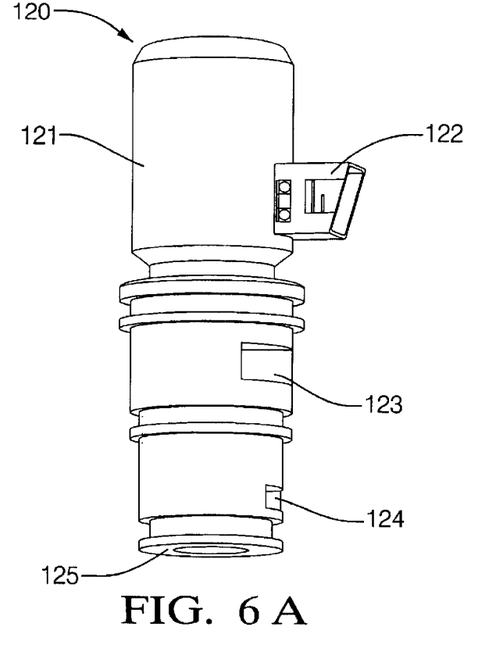
FIGS. 6A and 6B are front plan and a side perspective views, respectively of a exemplary electronic flow control valve.

Thus, as rotor 46 revolves around its axis, fluid is drawn into inlet ports 6 and one portion of the fluid is expelled through a first outlet port, i.e., discharge port 80 as seen in FIGS. 4, 5 and the remaining fluid is expelled through second discharge port 82. Pump 20 is constructed in such a way that all fluid exiting discharge port 80 is passed to pump discharge outlet 86 while the fluid exiting second discharge port 82 is passed either to primary discharge outlet 86 or auxiliary discharge outlet 140. In FIG. 1, fluid that exits primary discharge outlet 86 is passed to high-pressure side 2, while fluid that exits auxiliary discharge outlet 88 is passed directly to low-pressure side 4 via bypass line 140.

Figure 2:
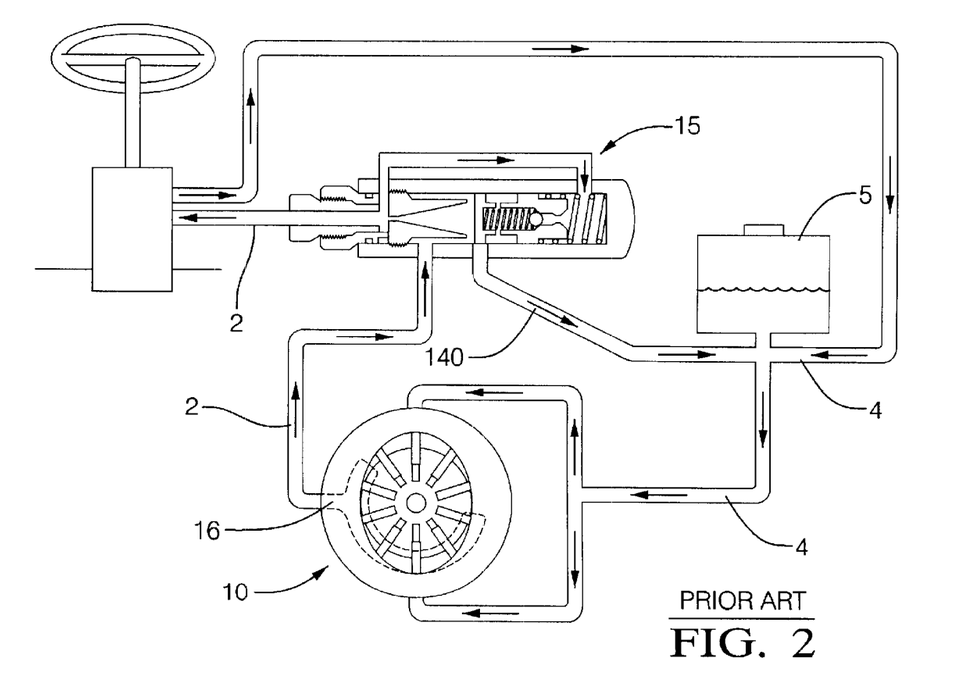
FIG. 2 is a schematic diagram of a typical hydraulic steering system of the prior art.

Thus, when pump 20 is configured to pass fluid from second discharge port 82 to auxiliary discharge outlet 88, vanes 9 on one side of rotor 46 do not act against the back pressure of load 3 and the torque required to rotate rotor 46 is therefore significantly reduced. The system shown in FIG. 1 may be compared to a typical system of the prior art as shown in FIG. 2. Here, a pressure relief valve 15 or other flow-control mechanism is inserted in the high-pressure side 2 of the system. This external unit is configured to pass high-pressure fluid from the high-pressure side 2 to the low-pressure side 4 of the system via a bypass line 140, thereby preventing excessive pressure differential across the pump and the load (i.e., between the high and low-pressure sides). Thus, under circumstances where conventional pump 10 is operating at a high speed and under low hydraulic loads, a significant amount of energy expended in generating a high pressure fluid in at the outlet 16 is lost because pressure relief valve 15 throttles the excess fluid to the low-pressure side 2 of the system. The system shown in FIG. 1, however, has the option of passing fluid from one discharge port directly to low pressure side 4 via bypass line 140. Since the system of FIG. 1 does not throttle the fluid (or throttles less fluid, in the case where load 3 includes a pressure-relief valve) only a small amount of energy is lost.

Figure 3:
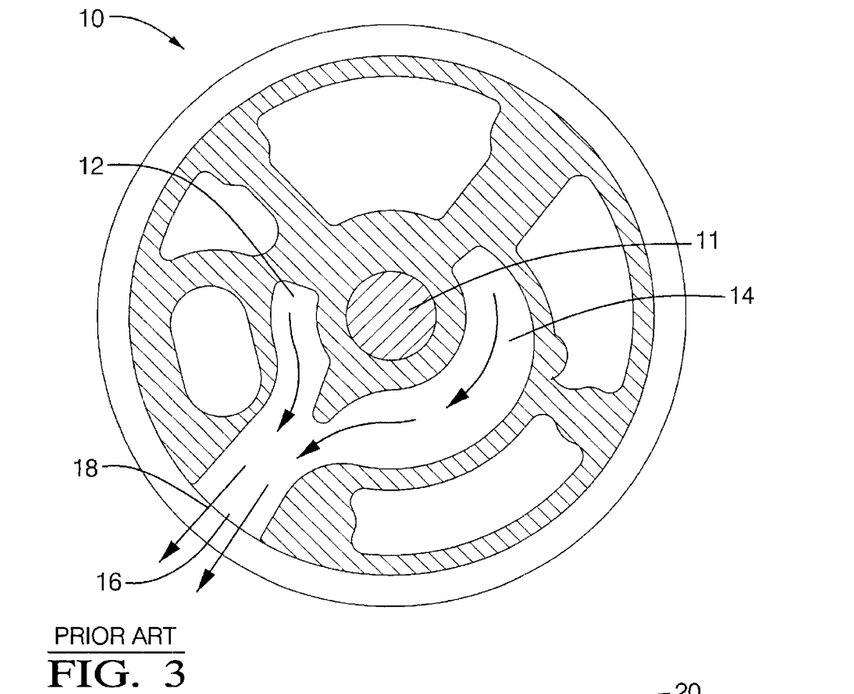
FIG. 3 is a cross a cross sectional view of a conventional single-output pump.

FIG. 3 is a cross sectional view of a typical conventional vane-type pump 10 such as that depicted in FIG. 2. Conventional pump 10 comprises a pump having dual internal discharge ports that join at a common discharge outlet 16. As is known in the art, the vanes within the rotor and the cam ring (not shown) define pumping chambers. More specifically, the space between the rotor, ring and any two adjacent vanes defines a single pumping chamber. The rotor is driven by a drive shaft 11. The rotation of the rotor and movement of the vanes causes the volume of each pumping cavity to constantly change due to the shape of the cam ring which is typically oval-shaped (elliptical). As the vanes move through the "rising" portion of the cam ring, the volume of each pumping cavity increases resulting in the fluid being drawn through a charging port of the pump. Conversely when the vanes move into the "falling" portion of the cam ring contour, the volume of each pumping cavity decreases. Decreased volume within the pumping cavity causes an increase in pressure within each pumping cavity resulting in the fluid being forced out of the pumping cavity and through first and second discharge ports 12, 14 of the pump.

Because each side of the rotor is exposed to the same inlet and outlet pressures, the radial forces on the rotor caused by the fluid pressure are balanced, which significantly reduces stress on the bearings supporting the rotor. Pumps having corresponding pumping chambers symmetrically disposed around the circumference of the rotor are generally referred to as "balanced" pumps. Because the radial forces on a balanced pump are balanced, they require less robust bearings. This has always been recognized as the main advantage of multi-port vane pumps. However, to maintain this advantage, each side of the rotor must be exposed to the same pressure.

The illustrated balanced conventional pump 10 shown in FIG. 3 includes a first discharge port 12 and a second discharge port 14. In this design, first and second discharge ports 12, 14 are routed to a common discharge outlet 16. The fluid flow paths from the first and second discharge ports 12, 14 are generally indicated by directional arrows 18. In this example, pump 10 is required to force the fluid through the common discharge outlet 16. Thus, the fluid from both discharge ports 12, 14 work against the same system back pressure.

As is known, the energy consumption of the pump is linked to the amount of torque required to drive the unit and as the back pressure increases, an increase in torque required to drive pump 10 is likewise observed and energy consumption rises. Furthermore, since pump 10 is a fixed-displacement pump, as the speed of the pump increases, the flow rate correspondingly increases. Consequently, at high pump speeds, the flow rate may exceed the demands of the system, and a significant portion of the fluid discharged from the pump may be passed to the reservoir 5 via pressure relief valve 15. Pump 10 is therefore operating at less than efficient conditions because all of the discharged fluid is exposed to the working line pressure of the system, while only a fraction of the discharged fluid is actually used to do useful work.

It should also be noted that the useful work done by the pump will be related to the pressure differential between the high and low-pressure sides of the system. In automotive uses, a high RPM often indicates that the vehicle is traveling at high speed. At high speed, however, less hydraulic work is often required for certain systems, such as power steering systems. The extra pressure differential between the high and low-pressure lines at high RPM is therefore unneeded and the strain on the system and energy expended to overcome the increased pump torque is wasted.

Referring to FIGS. 1, 4–7, a dual port hydraulic fixed-displacement pump is made more efficient by limiting the volume of the discharged fluid, e.g. oil that is subjected to the line pressure of the primary hydraulic load or loads.

Referring to FIG. 4, pump 20 includes a pump housing 22 having an internal housing cavity 24 with a large opening 26 at one end thereof and a smaller opening 28 at the other end thereof. A drive shaft 30 extends through the smaller opening 28 and is rotatably supported in a shaft bearing 51 which is secured in the opening 28 and is contacted by a shaft seal 32 also secured within the opening 28. Adequate shaft support is placed in the assembly to deal with bending loads which result from the unbalanced condition when pump 20 is operating in a fuel efficient or auxiliary mode. The shaft seal 32 functions to prevent atmospheric air from entering the pump 20 and fluid leakage from pump 20.

Within the housing cavity 24 is a vane pump assembly, generally designated at 40, and includes a pressure plate 42, a cam ring 44, a rotor 46, a plurality of vanes (not shown), and an end cover 49 and thrust plate 50. The end cover 49 cooperates with annular seal ring 52 and a locking ring 54 to close the large opening 26.

The rotor 46 includes a plurality of slots in which the plurality of vanes are slidably disposed as is known in the art. The plurality of vanes contact the inner surface of cam ring 44 so as to provide a plurality of peripheral pumping chambers 60 which expand and contract upon the rotation of rotor 46 when it is driven by a drive shaft 30. The thrust plate 50 includes discharge porting arrangements as will be described in greater detail hereinafter to effectively direct the forced fluid from vane pump assembly 40 to discharge passageways and outlets of the pump 20 which act to distribute the fluid to the other components of the system. The discharged fluid from the pumping chambers 60 of the vane assembly 40 passes through the thrust plate 50 to first and second discharge ports 80 and 82, respectively, which in turn are in fluid communication with a pump discharge passage (not shown in FIG. 4) formed in pump housing 22.

FIG. 5 shows an axial cross-sectional view of the exemplary pump 20 shown in FIG. 4. FIG. 5 illustrates the dual fluid discharge port design of the pump 20. First discharge port 80 fluidly communicates with primary discharge outlet 86. As in the conventional pump 10 shown in FIG. 3, first discharge port 80 is part of a primary discharge passageway 90 for the fluid to flow in response to the pumping action. In FIG. 5, a primary discharge path in which the fluid flows from first discharge port 80 is illustrated by directional arrow 92. Because the first discharge port 80 is directly connected to the primary discharge outlet 86, this primary discharge passageway 90 is exposed to working line pressure of a primary load or loads under all operating conditions of the pump.

According to the preferred embodiment, second discharge port 82 partially defines a second discharge path for the fluid to flow in response to the action of pump 20. In the exemplary and illustrated embodiment, second discharge port 82 fluidly communicates with a secondary discharge passageway 110 so that fluid flowing through second discharge port 82 is directed to secondary discharge passageway 110.

Secondary discharge passageway 110 includes a flow control valve 120. Flow control valve 120 is mounted to direct the fluid flowing from second discharge port 82 and secondary discharge passageway 110 into common port 125 of the valve 120. The valve will then either direct the flow out through a first valve switched port to auxiliary outlet 88 or through a second valve switched port into connecting conduit 114 according to a flow path indicated by directional arrow 130 and on to the discharge outlet 86 to join with flow path 92. In other words, flow control valve 120 dictates whether the fluid flowing from the secondary discharge port goes to the high-pressure side 2 of the system or is diverted to the low-pressure side 4 via the bypass line 140. Note that because valve 120 controls only one discharge port, the maximum fluid flow that can be diverted to auxiliary discharge outlet 88 is 50% of the total, assuming equality of first and second discharge ports 80, 82.

Figure 7:
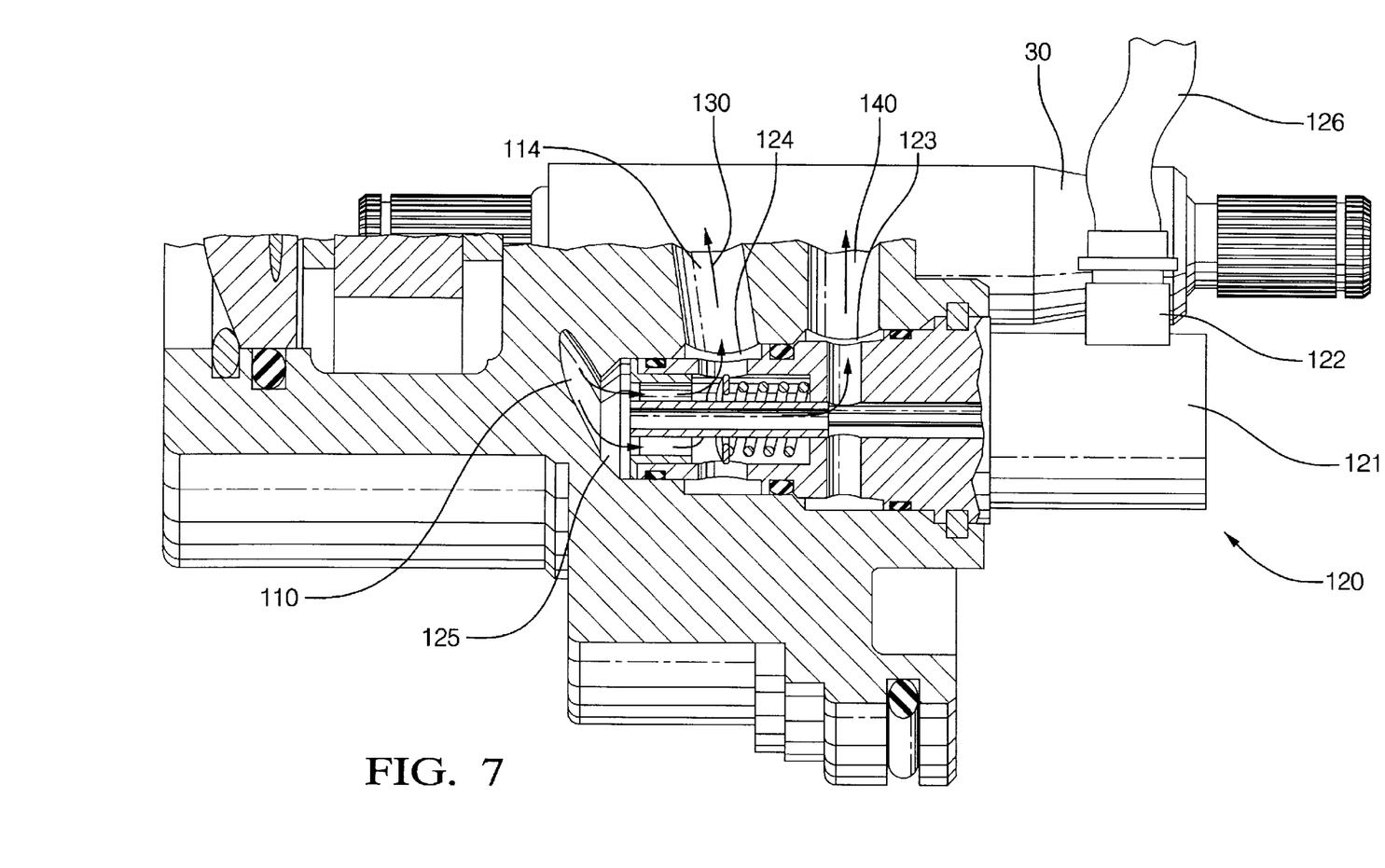
FIG. 7 is a sectional side view of the flow control valve of FIG. 6 mounted within the pump of FIG. 4.

Referring to FIGS. 6A, 6B, and 7, flow control valve 120 may comprise any number of suitable valves which are designed to actuate upon application of an electronic signal, which will preferably be designed to coincide with the occurrence of a predetermined event, such as when the fluid flowing through the system exceeds a predetermined rate, or when the pressure differential across the pump exceeds a predetermined level, or when the pump or car engine exceeds a predetermined RPM, or other suitable indicia as well as any suitable combinations thereof. Detection of such conditions may be effected by sensors and circuitry as are known in the art.

Referring to FIGS. 6A and 6B, a preferred control valve 120 will have an actuator 121 and an input terminal 122 for receiving an electric signal for controlling the actuator 121. There is also provided at least one common port 125 and two switched ports, a first switched port 123 and a second switched port 124. When the actuator is in a first condition, the first switched port 123 will be in fluid communication with the common port 125. When the actuator is in a second condition, the second switched port 124 is in fluid communication with the common port 125. In a preferred embodiment, the actuator 121 is a solenoid-type actuator having only a first and second condition such that fluid flow is either entirely directed through one switched port or the other.

Referring to FIG. 7, flow control valve 120 comprises a electronically controlled valve which is designed to actuate when the fluid flowing within the secondary discharge passageway 110 reaches a predetermined flow rate. Prior to that event, the actuator 121 is in the first condition so that fluid coming from the second discharge port 82 (not shown in this FIG.) enters the valve common port 125 and passes through the second valve switched port 124 as depicted by flow arrow 130. In this state, the pump behaves like any prior art dual port pump like that shown in FIG. 3.

Upon actuation of flow control valve 120 toward the second condition, the fluid flowing through the valve is diverted to the auxiliary discharge outlet 88 which fluidly communicates with, e.g., the low-pressure side of the system as shown in FIG. 1, or an auxiliary load or loads as will be further described below. A cable conduit 126 is provided to carry control wires to the valve's input terminal 122.

Because control of the valve is electronic, the designer of the system has great flexibility to determine what first set of operating conditions will cause the valve to be in the first condition and what second set of operating conditions will trigger the valve to switch over toward the second condition. The switch may occur in response to such operating conditions as excessive pressure differential between the high and low-pressure sides, excessive pump rate of rotation (RPM), or excessive rate of fluid flow, among others. The designer may opt for a continuous valve so that the change from the first to the second condition occurs smoothly and continuously. The designer then has very fine control over the system and may tailor very specific responses to changes in system operating conditions.

It will be understood that a person skilled in the art may make modifications to the preferred embodiment shown herein within the scope and intent of the claims. For example, features and advantages of the present system may be incorporated into a number of types of pumping assemblies, including piston pumps, vane-type pumps and gear pumps; however, for the purpose of illustration only, the present system is described with reference to an exemplary dual port hydraulic fixed-displacement vane-type pump. While the present invention has been described as carried out in a specific embodiment thereof, it is not intended to be limited thereby but is intended to cover the invention broadly within the scope and spirit of the claims.

What is claimed is:

1. A hydraulic pump comprising:
   a housing;
   a primary discharge outlet;
   an auxiliary discharge outlet;
   a flow control valve;
   a first fluid passageway within said housing passing fluid from a first discharge port to said primary discharge outlet;
   a second fluid passageway within said housing passing fluid from a second discharge port to a common port of said flow control valve;
   a third fluid passageway within said housing passing fluid from a first switched port of said flow control valve to said auxiliary discharge outlet;
   a fourth fluid passageway within said housing connecting a second switched port of said flow control valve to said primary discharge outlet; and
   wherein said primary discharge outlet and said auxiliary discharge outlet are each adapted for connection with external lines of a hydraulic system.

2. The hydraulic pump of claim 1 wherein said first discharge port and said second discharge port are not in fluid communication with each other upstream of said first and second discharge ports.

3. The hydraulic pump of claim 1 wherein said flow control valve is movable between a first and second position wherein when said flow control valve is in said first position, fluid from said first discharge port is directed to said primary discharge outlet whereas when said flow control valve is in said second position, fluid from said first discharge port is directed to stud auxiliary discharge outlet.

4. The hydraulic pump of claim 1 further comprising:

a vane pump assembly disposed within said housing, said vane pump assembly comprising a rotor, said rotor having a plurality of radially disposed vanes;

a cam ring disposed around said rotor, said cam ring having an inner surface facing said rotor, said inner surface being generally elliptical, said rotor being generally circular and extending substantially across a minor axis of said inner surface thereby farming two pumping spaces between said rotor and said inner surface;

a thrust plate and a pressure plate disposed generally parallel to each other on either side of said two pumping spaces thereby closing said two pumping spaces;

wherein said vanes extend from said rotor to said cam ring thereby dividing each said two pumping spaces into a plurality of chambers;

an inlet part into each pumping space, and wherein each of said first and second discharge ports discharging fluid from a respective one of said two pumping spaces.

5. A hydraulic system comprising the pump of claim 1 and further comprising:

a primary hydraulic load connected to said primary discharge outlet;

a bypass line connected to said auxiliary discharge outlet, said bypass line extending from said auxiliary discharge outlet and a law pressure side of said hydraulic system.

6. A hydraulic system comprising the pump of claim 1 and further comprising:

a primary hydraulic load connected to said primary discharge outlet via a high pressure line external to said pump and an auxiliary hydraulic load connected to said auxiliary discharge outlet via a second high pressure line external to said pump.

7. The hydraulic system of claim 6 wherein said primary hydraulic load comprises a hydraulic clutch of a continuously variable transmission.

8. The hydraulic system of claim 7 wherein said pump is disposed in a housing of said continuously variable transmission.

9. The hydraulic system of claim 6 further comprising a jet booster disposed downstream of said auxiliary hydraulic load for improving fluid pressure at an inlet of said pump.

10. A hydraulic system comprising:

a hydraulic pump having:

a housing, a flow control valve, a first fluid passageway within said housing passing fluid from a first discharge port to a primary discharge outlet, a second fluid passageway within said housing passing fluid from a second discharge port to a common port of said flow control valve, a third fluid passageway within said housing passing fluid from a first switched port of said flow control valve to an auxiliary discharge outlet, and a fourth fluid passageway within said housing connecting a second switched port of said flow control valve to said primary discharge outlet, each of said primary discharge outlet and said auxiliary discharge outlet being adapted for connection with hydraulic lines external to said pump;

a primary hydraulic load connected via a hydraulic line to said primary discharge outlet;

a low pressure reservoir connected to a low pressure side of said primary hydraulic load; and an intake line connected between said low pressure reservoir and an intake of said hydraulic pump.

11. The hydraulic system of claim 10, said system further comprising:

a jet booster in fluid communication with said auxiliary discharge outlet, said jet booster configured to increase pressure at said intake when said pump operates in said binary mode.

12. The hydraulic system of claim 10, said system further comprising:

an auxiliary load connected via a hydraulic line to said auxiliary discharge outlet.

13. The hydraulic system of claim 12 further comprising a jet booster in fluid communication between said auxiliary load and jet booster configured to increase pressure at said intake when said pump operates in said binary mode.

14. The hydraulic system of claim 10 wherein said pump comprises a dual port vane pump.

15. The system of claim 10, said pump further comprising:

a vane pump assembly disposed within said housing, said vane pump assembly comprising a rotor, said rotor having a plurality of radially disposed vanes;

a cam ring disposed around said rotor, said cam ring having an inner surface facing said rotor, said inner surface being generally elliptical, said rotor being generally circular and extending substantially across a minor axis of said inner surface thereby forming two pumping spaces between said rotor and said inner surface;

a thrust plate and a pressure plate disposed generally parallel to each other on either side of said two pumping spaces thereby closing said two pumping spaces;

wherein said vanes extend front said rotor to said cam ring thereby dividing each said two pumping spaces into a plurality of chambers;

an inlet port into each pumping space, and wherein each of said first and second discharge ports discharging fluid from a respective one of said two pumping spaces.

* * * * *